(12) United States Patent
Engtröm et al.

(10) Patent No.: US 8,391,611 B2
(45) Date of Patent: Mar. 5, 2013

(54) METHODS, SYSTEMS AND COMPUTER PROGRAM PRODUCTS FOR IDENTIFYING DESCRIPTORS FOR AN IMAGE

(75) Inventors: Jimmy Engtröm, Malmö (SE); Bo Larsson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 711 days.

(21) Appl. No.: 12/603,068

(22) Filed: Oct. 21, 2009

(65) Prior Publication Data
US 2011/0091112 A1    Apr. 21, 2011

(51) Int. Cl.
G06K 9/48 (2006.01)
G06K 9/68 (2006.01)
(52) U.S. Cl. ..................... 382/197; 382/218
(58) Field of Classification Search .......... 382/197, 382/218, 181, 203, 209
See application file for complete search history.

(56) References Cited

U.S. PATENT DOCUMENTS

| | | | |
|---|---|---|---|
| 6,014,461 A * | 1/2000 | Hennessey et al. | 382/195 |
| 6,754,667 B2 * | 6/2004 | Kim et al. | 1/1 |
| 6,880,082 B2 * | 4/2005 | Ohta | 713/168 |
| 8,204,883 B1 * | 6/2012 | Smith et al. | 707/736 |
| 2007/0122031 A1 * | 5/2007 | Berriss et al. | 382/165 |
| 2007/0260639 A1 | 11/2007 | Tobin et al. | |
| 2008/0201322 A1 | 8/2008 | Terayoko | |
| 2010/0309226 A1 * | 12/2010 | Quack et al. | 345/634 |
| 2012/0170852 A1 * | 7/2012 | Zhang et al. | 382/197 |

FOREIGN PATENT DOCUMENTS

GB    2 444 535 A    6/2008

OTHER PUBLICATIONS

The International Search Report and the Written Opinion for PCT/IB2010/002387 mailed on Apr. 6, 2011.

* cited by examiner

*Primary Examiner* — Daniel Mariam
(74) *Attorney, Agent, or Firm* — Myers Bigel Sibley & Sajovec

(57) ABSTRACT

Methods for automatically providing descriptors for images to a user include providing an image descriptor database having a plurality of image feature vectors, each of the plurality of image feature vectors having an associated descriptor. A specificity value is assigned to each of the descriptors such that the specificity value comprises an estimation of a degree of description specificity. A first image feature vector is determined for a first image, and the first image feature vector is compared with the plurality of image vectors in the image descriptor database. One or more descriptors for the first image vector is identified based on the comparison of the first image feature vector with the plurality of image vectors and the specificity value of the corresponding descriptor.

13 Claims, 5 Drawing Sheets

METHODS, SYSTEMS AND COMPUTER PROGRAM PRODUCTS FOR IDENTIFYING DESCRIPTORS FOR AN IMAGE

FIELD OF THE INVENTION

The present invention relates to image classification methods, systems and computer program products for providing descriptors related to an image.

BACKGROUND

With the widespread use of digital cameras, including digital cameras provided as part of a mobile phone or other hand held device, many camera users are able to take a large number of images. Although many users of such devices enjoy the convenience with which digital images may be obtained, having unsorted digital libraries of many images can make navigating the images very time consuming. Users sometimes manually "tag" each image with a descriptor or several descriptors that identities the image.

Some digital cameras may provide intelligent suggestions for suitable descriptors for new images based on a database of tags and corresponding image feature vectors, which numerically represent the features in an object image. Some databases of image descriptors use the description of images provided by a user to train the database of tags and image feature vectors by adding the image feature vector of new images and the corresponding tags into the database. However, these techniques can introduce inaccurate tags if a user adds inaccurate tags to an image.

SUMMARY OF EMBODIMENTS OF THE INVENTION

According to some embodiments of the invention, methods for automatically providing descriptors for images to a user include providing an image descriptor database having a plurality of image feature vectors, each of the plurality of image feature vectors having an associated descriptor. A specificity value is assigned to each of the descriptors such that the specificity value comprises an estimation of a degree of description specificity. A first image feature vector is determined for a first image, and the first image feature vector is compared with the plurality of image vectors in the image descriptor database. One or more descriptors for the first image vector is identified based on the comparison of the first image feature vector with the plurality of image vectors and the specificity value of the corresponding descriptor.

In some embodiments, image feature vectors in the database that have a selected associated descriptor in common are compared to determine an estimated degree of similarity between the image feature vectors, and the specificity value is assigned to the selected descriptor responsive to the estimated degree of similarity. The image feature vector can include image pixel data and/or characteristics determined by image recognition techniques.

In some embodiments, the image feature vector comprises a geographic location of the image, a time stamp, and/or a user identifier.

In some embodiments, the image descriptor database is provided by receiving image data including the plurality of image feature vectors and corresponding descriptors from a plurality of users and populating the image descriptor database with the plurality of image feature vectors and the corresponding descriptors.

In some embodiments, the methods include displaying the descriptors corresponding to the identified image feature vectors to a user and receiving a selection of one of the descriptors from the user. The image descriptor database can be updated such that the first image feature vector and the selected one of the descriptors is provided as one of the plurality of image feature vectors and corresponding descriptors.

In some embodiments according to the present invention, systems for automatically providing descriptors for images to a user include an image descriptor database having a plurality of image feature vectors, each of the plurality of image feature vectors having an associated descriptor. A specificity value comprising an estimation of a degree of description specificity is assigned to each of the descriptors. A controller is configured to determine a first image feature vector for a first image, to compare the first image feature vector with the plurality of image vectors in the image descriptor database, and to identify one or more descriptors for the first image vector based on the comparison of the first image feature vector with the plurality of image vectors in the image descriptor database and the specificity value of the corresponding descriptor.

In some embodiments, the controller is further configured to compare image feature vectors in the database that have a selected associated descriptor in common to determine an estimated degree of similarity between the image feature vectors and to assigning the specificity value to the selected descriptor responsive to the estimated degree of similarity. The image feature vector can include image pixel data and/or characteristics determined by image recognition techniques. The image feature vector can include a geographic location of the image, a time stamp, and/or a user identifier.

In some embodiments, the image descriptor database is configured to receive image data and corresponding descriptors from a plurality of users and the image descriptor database is populated with the plurality of image feature vectors and the corresponding descriptors.

In some embodiments, the controller is configured to display the descriptors corresponding to the identified image feature vectors to a user and to send a selection of one of the descriptors to the image descriptor database.

In some embodiments, the image descriptor database is updated such that the first image feature vector and the selected one of the descriptors is provided as one of the plurality of image feature vectors and corresponding descriptors.

In some embodiments according to the present invention, a computer program product for automatically providing descriptors for images to a user based on an image descriptor database having a plurality of image feature vectors is provided. Each of the plurality of image feature vectors has an associated descriptor. A specificity value is assigned to each of the descriptors such that the specificity value comprises an estimation of a degree of description specificity. The computer program product includes a computer readable medium having computer readable program code embodied therein. The computer readable program code includes computer readable program code that is configured to determine a first image feature vector for a first image, computer readable program code that is configured to compare the first image feature vector with the plurality of image vectors in the image descriptor database, and computer readable program code that is configured to identify one or more descriptors for the first image feature vector based on the comparison of the first image feature vector with the plurality of image vectors and the specificity value of the corresponding descriptor.

In some embodiments, the computer program product further comprises computer readable program code that is configured to compare image feature vectors in the database that have a selected associated descriptor in common to determine an estimated degree of similarity between the image feature vectors and computer readable program code that is configured to assign the specificity value to the selected descriptor responsive to the estimated degree of similarity. The image feature vector can include image pixel data and/or characteristics determined by image recognition techniques. The image feature vector can include a geographic location of the image, a time stamp, and/or a user identifier.

In some embodiments, the image descriptor database is configured to receive image data including the plurality of image feature vectors and corresponding descriptors from a plurality of users and the image descriptor database is populated with the plurality of image feature vectors and the corresponding descriptors.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

Figure 1A:
FIGS. 1A-1C are digital images of a Lady's Slipper Orchid flower according to some embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

As used herein, an "image feature vector" is a representation of image feature characteristics. Image feature vectors may include numerical representations of pixel or image characteristics, including shapes, colors, textures and the like. Image feature vectors may also include characteristics that are determined using image recognition techniques, including image recognition techniques known to those of skill in the art. For example, image recognition techniques can be used to identify an object, person, or landmark (e.g., a beach, the Eiffel tower, the Empire State Building, etc.) in an image, and this information can be included in the image feature vector. Image feature vectors may also include information about the image or embedded information, such as a time stamp of when the picture was taken, a user identifier tag to identify which user captured an image, a geographic location of where the picture was taken, which can be automatically embedded by a GPS unit.

As used herein, a "descriptor" is a term or group of terms that describe an image. Descriptors include tag identifiers that may be added by a user and/or selected by a database of descriptors.

As used herein, a "specificity value" is an estimation of a degree of specificity for a descriptor. A descriptor with a relatively high degree of specificity may describe an image more accurately and/or with greater detail than a descriptor with a relatively low degree of specificity. Users may also assign descriptors with a relatively low degree of specificity to a greater range of images, e.g., images with greater differences between their respective image feature vectors. A "specificity value" for a given descriptor may be determined by the degree of similarity between the image feature vectors that share the same descriptor.

Figure 1B:
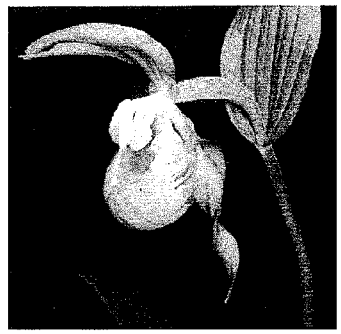
Figure 2:
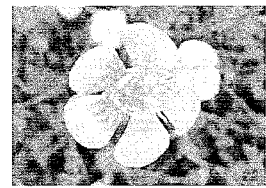
FIG. 2 is a digital image of a buttercup flower according to some embodiments of the present invention.
Figure 1C:
Figure 3:
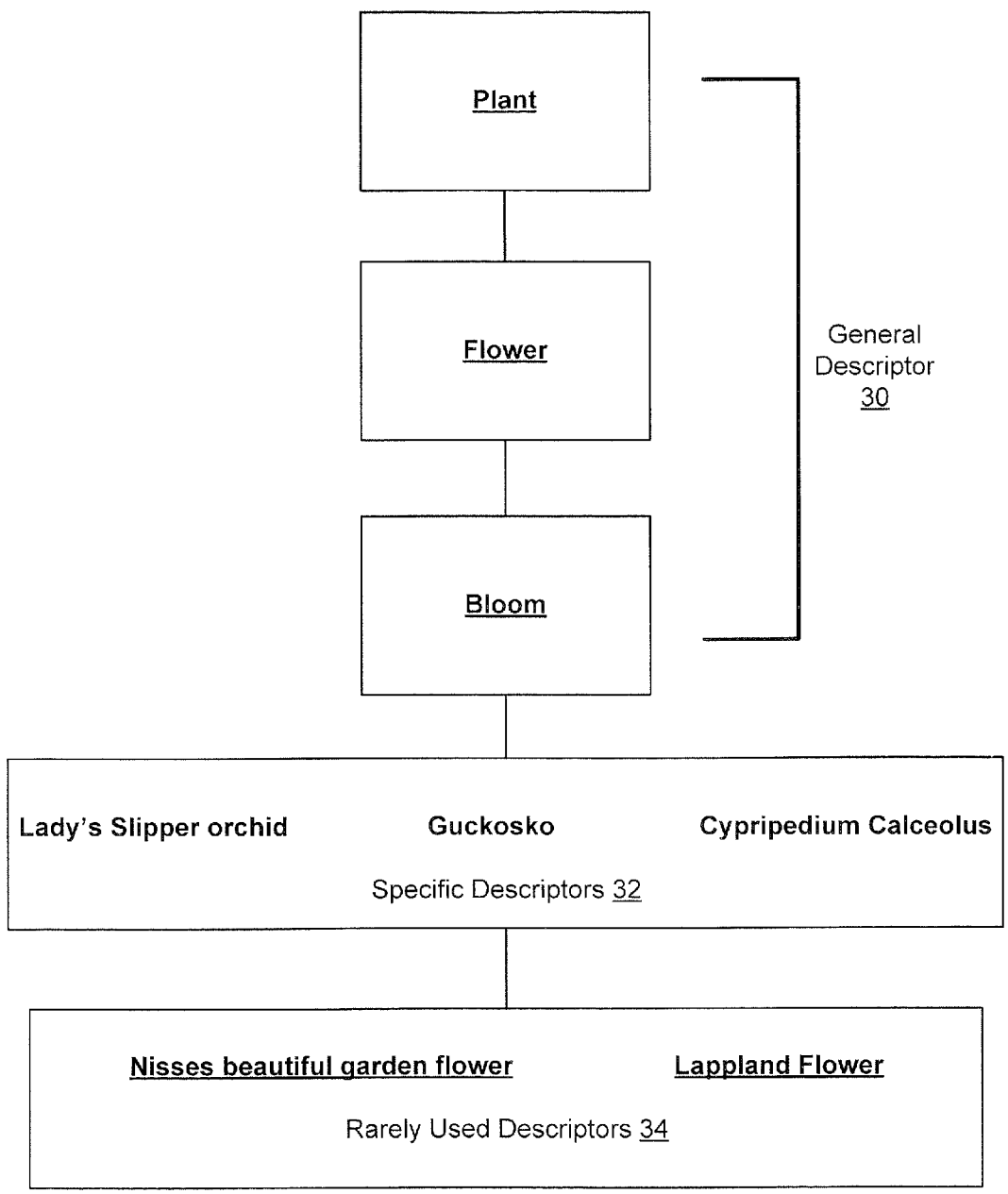
FIG. 3 is a diagram of descriptors that may be associated with the images of FIGS. 1A-1C according to some embodiments of the invention.

FIGS. 1A-1C illustrate three images of a type of flower having a Latin name of *Cypripedium Calceolus*, which is commonly called a Lady's Slipper orchid. FIG. 2 illustrates another type of flower called a buttercup. As shown in FIG. 3, a hierarchical diagram of exemplary tag descriptors for the type of flower shown in FIGS. 1A-1C are shown including general descriptors 30 (listed in order from most general to more specific: plant, flower, and bloom), specific descriptors 32 (Lady's Slipper orchid, Guckosko, and *Cypripedium Calceolus*) and rarely used descriptors 34 (Nisses beautiful garden flower and Lappland flower). The image feature vectors for FIGS. 1A-1C would generally be more similar to one another than the image feature vector of FIG. 2. The more general descriptors 30 (i.e., having a relatively low specificity value) may also be used to identify the type of flower shown in the image of FIG. 2; however, the more specific descriptors 32 (i.e., having a relatively high specificity value) describe the Lady's Slipper orchid in FIGS. 1A-1C, but not the buttercup in FIG. 2. Accordingly, the more specific descriptors 32 are generally only used with the Lady's Slipper orchid such that the degree of similarity between image feature vectors sharing one of the more specific descriptors 32 is relatively high. The rarely used descriptors 34 include Nisses beautiful garden flower and Lappland flower.

According to some embodiments of the invention, the descriptors 30, 32 and 34 and other descriptors may be assigned to images (such as the images in FIGS. 1A-1C) by users in a database. The image feature vectors of the images and/or the number of users that select a descriptor can be used to assign a specificity value to the descriptors 30, 32 and 34.

Figure 4:
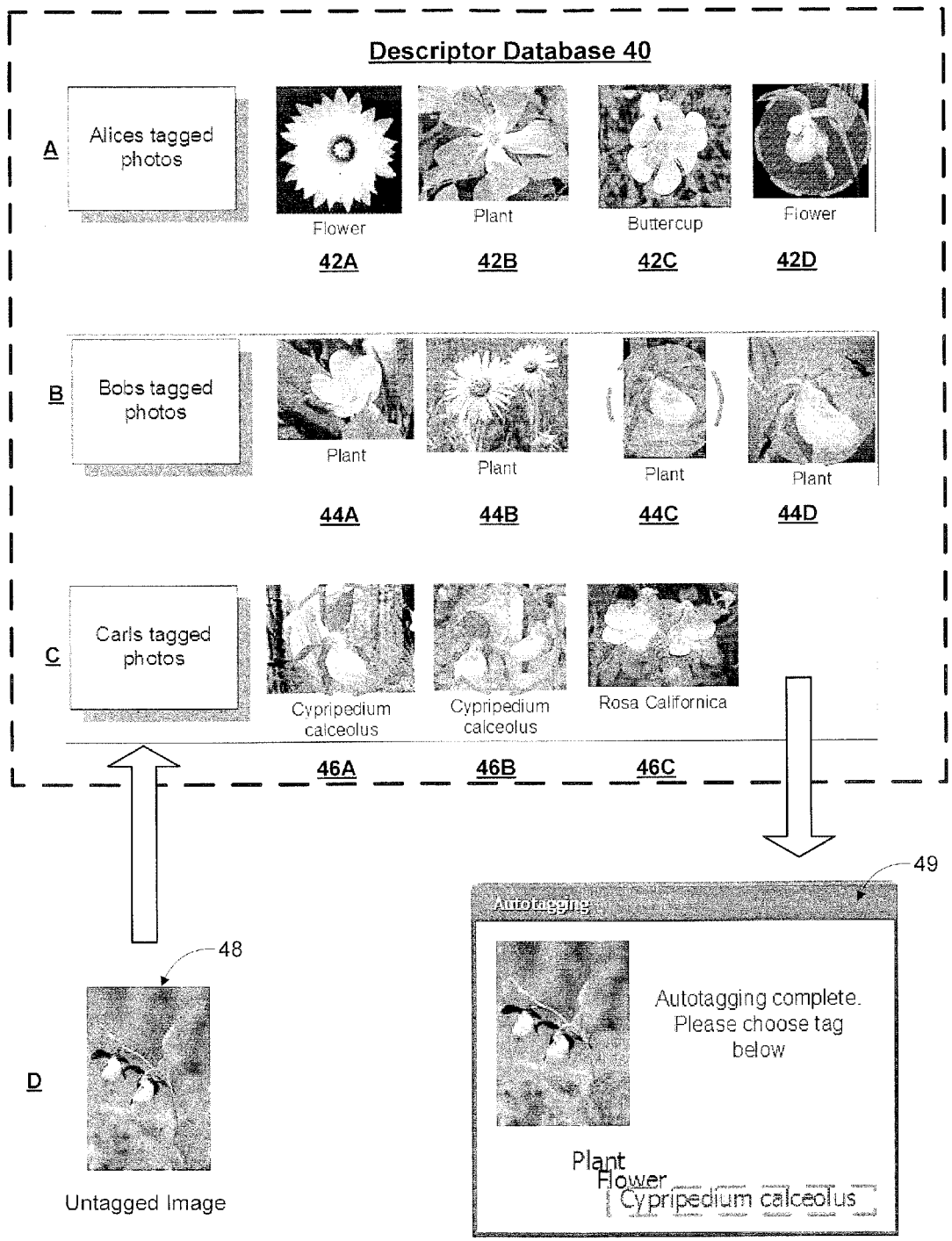
FIG. 4 is a diagram of a descriptor database that includes images and associate descriptors and a new image that can be added to the database based on a user identified descriptor according to some embodiments of the invention.

For example, as shown in FIG. 4, users A, B, and C have tagged images 42A-42D, 44A-44D and 46A-46C with various descriptor terms in a descriptor database 40. Each of the images 42A-42D, 44A-44D and 46A-46C has an associated image feature vector, which may include information identifying the type of flower shown, the color information, texture information, pixel information, the user who captured the image, the device that captured the image, the time the image was captured, and/or the geographic location where the image was captured.

Figure 7:
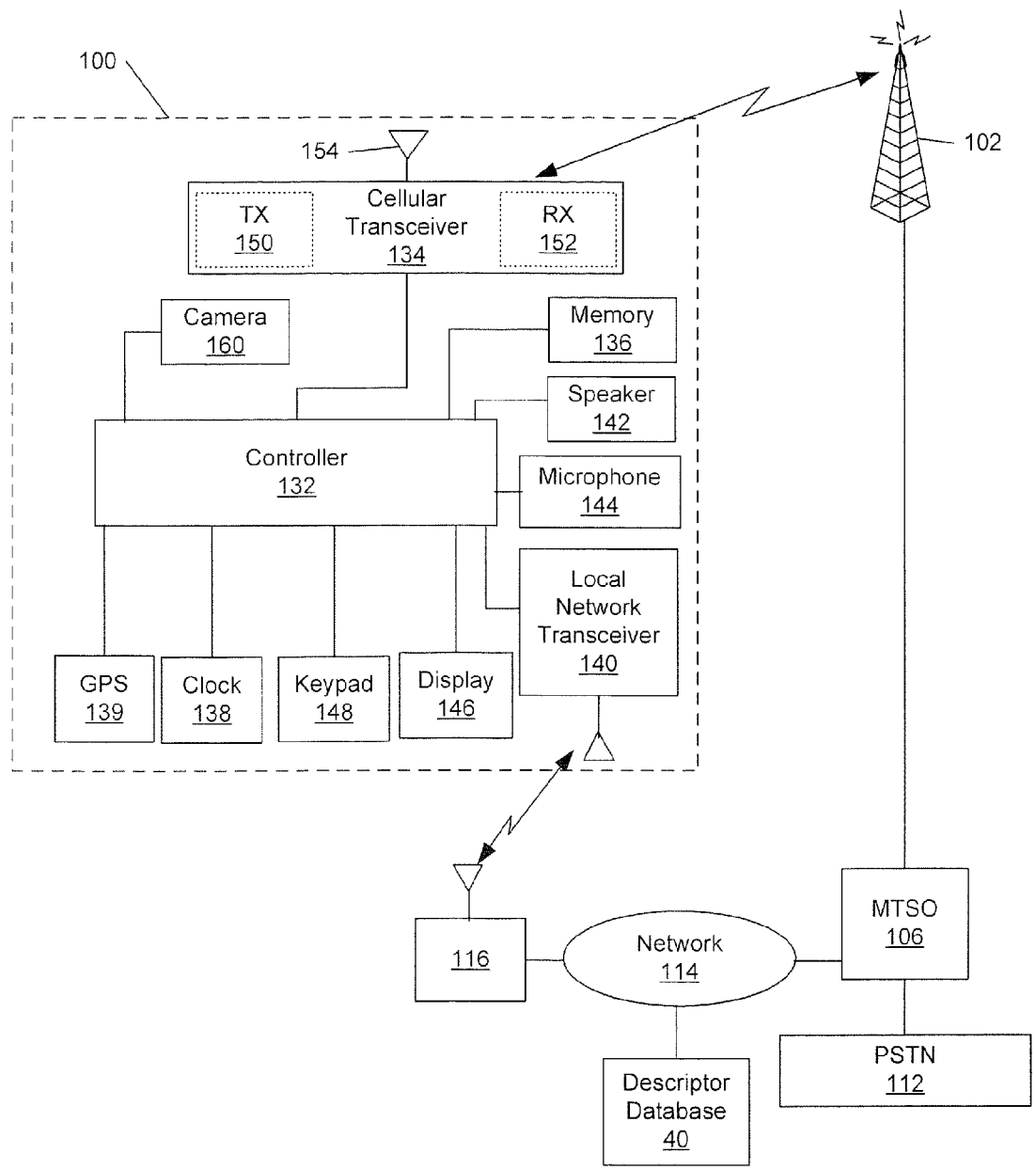
FIG. 7 is a block diagram of a mobile terminal having a camera according to some embodiments of the invention.

In some embodiments as shown in FIG. 7, the descriptor database 40 can be provided as part of a communications network for providing communications with a mobile terminal 100. As will be described in more detail below with respect to FIG. 7, the mobile terminal 100 may include a camera 160 and a controller 132 for allowing the user to choose a descriptor for images obtained from the camera 160. The images and associate descriptors can be automatically communicated from the mobile terminal 100 to the descriptor database 40. In this configuration, user-selected descriptors and associated images/image feature vectors can be added to the database 40 in a continuous manner such that the database may be improved and/or updated.

As further illustrated in FIG. 4, an untagged image 48 may be selected by a user and appropriate descriptors from the database 40 may be selected and provided to the user, for example, by the database 40 and/or the controller 132 in FIG. 7. As shown, the untagged image 48 is a Lady's Slipper orchid (Latin name *Cypripedium calceolus*). The image feature vector of the untagged image 48 is compared with the image feature vectors of the tagged images 42A-42D, 44A-44D and 46A-46C. Images 42D, 44C, 44D, 46A and 46B are identified as having image feature vectors that are sufficiently similar to the untagged image 48. The similarities identified between the image feature vectors of images 42D, 44C, 44D, 46A and 46B may include the general shape and/or color of the flower (as may be identified by analyzing pixel similarities and/or using image recognition techniques). In some embodiments, the image feature vector of the images 42D, 44C, 44D, 46A and 46B may include the geographic location where the image was captured, for example, regions in which the *Cypripedium calceolus* may be more commonly found. Accordingly, the tags associated with images 42D, 44C, 44D, 46A and 46B (i.e., "Plant," "Flower," and "*Cypripedium calceolus*") are provided or displayed to a user on a user interface 49 based on the identified image feature vector similarities between the untagged image 48 and the images 42D, 44C, 44D, 46A and 46B.

The image feature vector of the images 42A-42D, 44A-44D and 46A-46C and the untagged image 48 may include information about the user or camera device used to capture the image. The descriptors can be identified in the database 40 based, in part, on user preferences. For example, user C is apparently more likely to select scientific Latin names for a flower, and therefore, if the untagged image 48 was provided by user C, the descriptor "*Cypripedium calceolus*" could be identified and/or ranked more highly than general descriptors like "Plant" and "Flower." In some embodiments, face recognition techniques can be used to identify particular people in an image. For example, a user could identify friends and/or family members in images such that when a new image of a person is acquired by the user, a descriptor including the name of the user's friend or family member could be identified based on an electronic face recognition of the user's friend or family member. Moreover, some descriptors may be independent of the pixel image content of the image; for example, descriptors may be provided that identify the geographic region (e.g., city, country, etc.) where the image was captured.

The descriptors for the images 42A-42D, 44A-44D and 46A-46C have a specificity value that estimates the degree of specificity that the descriptor term describes an image, for example, similar to that shown in FIG. 3. The user interface 49 can display the descriptors in a rank order based on their specificity value, e.g., from most specific to least specific or from least specific to most specific. Accordingly, the specificity value of a given descriptor can be determined by comparing image feature vectors in the database that have a selected associated descriptor in common. The comparison can be used to determine an estimated degree of similarity between the image feature vectors. The specificity value is assigned to the selected descriptor based on the estimated degree of similarity between the image feature vectors in the database sharing the same associated descriptor. Accordingly, if a given descriptor is a relatively general term, the image feature vectors for the images using the descriptor will have a low degree of similarity. However, if a given descriptor is a relatively specific term, the image feature vectors for the images using the descriptor will typically have a high degree of similarity.

In particular embodiments, the specificity value for the descriptors of the images 42A-42D, 44A-44D and 46A-46C can be assigned as follows. The image feature vectors for the images 42A-42D, 44A-44D and 46A-46C in the database 40 with a common associated descriptor can be compared. For example, images 42A, 42B, 44A, 44B, 44C and 44D all have the same descriptor: "Plant." The images 46A and 46B have the descriptor, "*Cypripedium calceolus*." However, the images 42A, 42B, 44A, 44B, 44C and 44D are images of many different kinds of plants and therefore, the image feature vectors for the images 42A, 42B, 44A, 44B, 44C and 44D are be less similar than the image feature vectors of images 46A and 46B, which both depict the same type of flower. Thus, the descriptor "Plant" is assigned a relatively low specificity value and the descriptor, "*Cypripedium calceolus*" is assigned a relatively higher specificity value based on the degree of similarity to the image feature vector. Accordingly, the specificity value can be assigned to a selected descriptor in response to an estimated degree of similarity between the image feature vectors for images to which the descriptor is assigned.

In some embodiments, the descriptor database 40 can include descriptors that are only used by a very small number of users. As shown in FIG. 3, the rarely used descriptors 34 include "Nisses beautiful garden flower" and "Lappland flower." The descriptors 34 are identified as being rarely used when fewer than a threshold number of users has selected the descriptors 34. In particular embodiments, the rarely used descriptors 34 are excluded from the list of descriptors provided to the user on the user interface 49 irrespective of a degree of similarity to the untagged image 48 of FIG. 4.

Figures 5, 6:
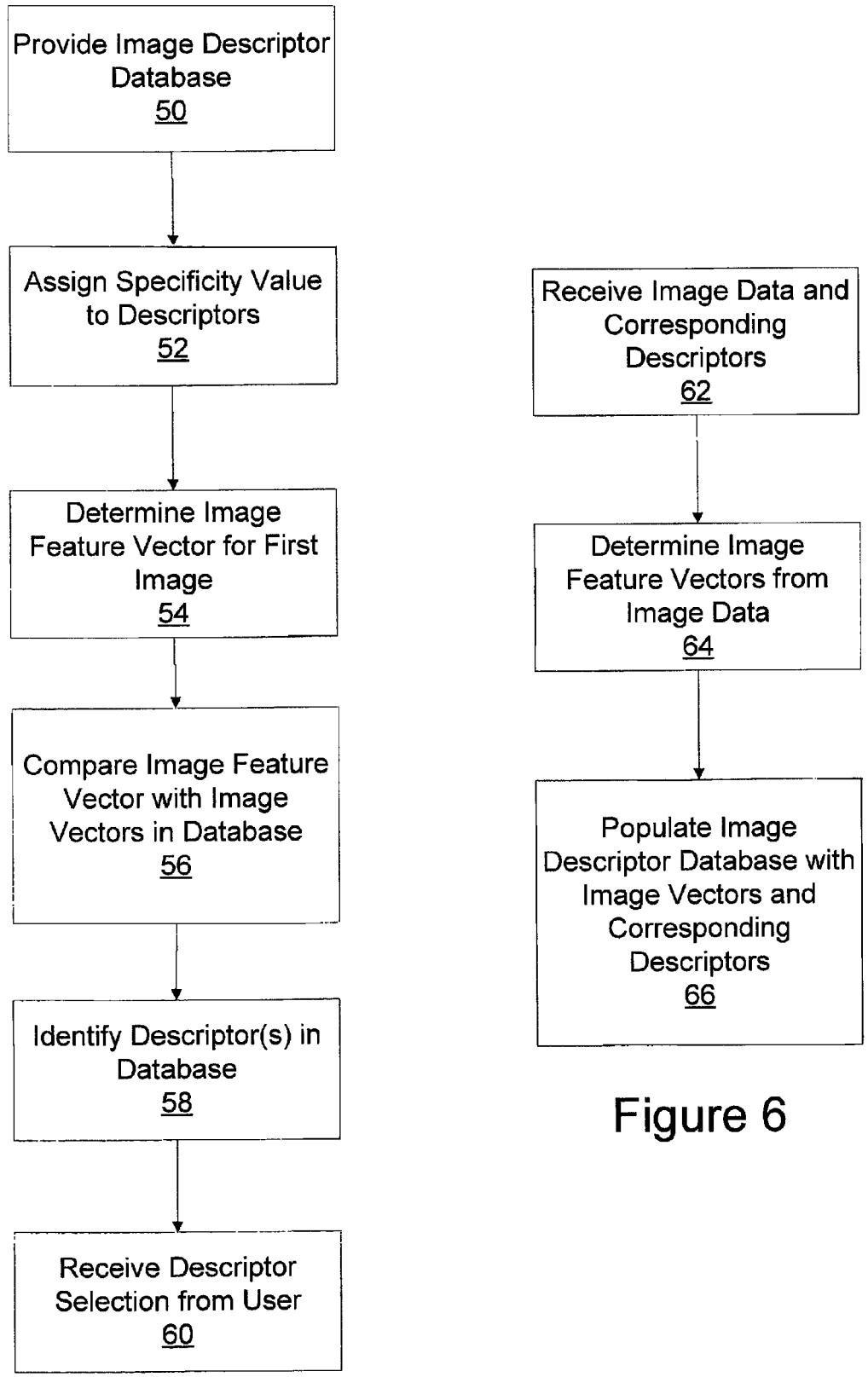
FIG. 5 is a flowchart of operations according to some embodiments of the invention.
FIG. 6 is a flowchart of operations according to some embodiments of the invention.

As shown in FIG. 5, embodiments according to the present invention can provide one or more descriptors for images to a user. An image descriptor database is provided that can include a plurality of image feature vectors such that each of the plurality of image feature vectors has an associated descriptor (Block 50). A specificity value is assigned to each of the descriptors (Block 52). The specificity value is an estimation of a degree of description specificity. A first image feature vector is determined for a first image based on features in the first image, for example, when a user identifies an untagged image (Block 54). The first image feature vector is compared with the plurality of image vectors in the image descriptor database (Block 56). One or more of the descriptors associated with the plurality of image feature vectors is identified based on a degree of similarity with the first image feature vector and the similarity value of the corresponding descriptor (Block 58). For example, the identified descriptors can be displayed to a user so that the user can select one of the descriptors (Block 60). In some embodiments, the image descriptor database is updated when the user selects one of the descriptors (Block 60) to include the first image feature vector and the selected descriptor. In some embodiments, a user can rejected a suggested descriptor or descriptors and enter a new descriptor by any suitable input method. The added descriptor is optionally added to the descriptor database.

As further shown in FIG. 6, providing an image descriptor database can include receiving the image data, such as an image feature vector, and corresponding descriptors from a plurality of users (Block 62). A plurality of image feature vectors can be determined based on the image data (Block 64). The image descriptor database can be populated with the plurality of image feature vectors and the corresponding descriptors (Block 66). It should be understood that the term "image data" can include image feature vectors, and thus, Block 64 may be omitted.

FIG. 7 is a schematic block diagram of a wireless communication system that includes a wireless terminal 100, such as a mobile wireless communications terminal, that receives wireless communication signals from a cellular base station 102 and/or a wireless local network 116. The cellular base station 102 is connected to a MTSO 106, which, in turn, is connected to a PSTN 112, and a network 114 (e.g., Internet). The mobile terminal 100 may communicate with the wireless local network 116 using a communication protocol that may include, but is not limited to, 802.11a, 802.11b, 802.11e, 802.11g, 802.11i, and/or other wireless local area network protocols. The wireless local network 116 may be connected to the network 114.

In some embodiments of the invention, the mobile terminal 100 includes various components, such as a camera 160, a controller 132, a cellular transceiver 134, a memory 136, a timing circuit (clock) 138, a global positioning system (GPS) unit 139, a local network transceiver 140, a speaker 142, a microphone 144, a display 146 and a keypad 148.

The memory 136 stores software, such as an image descriptor identification module, that is executed by the controller 132, and may include one or more erasable programmable read-only memories (EPROM or Flash EPROM), battery backed random access memory (RAM), magnetic, optical, or other digital storage device, and may be separate from, or at least partially within, the controller 132. The controller 132 may include more than one processor, such as, for example, a general purpose processor and a digital signal processor, which may be enclosed in a common package or separate and apart from one another.

In particular, the controller 132 may be configured to control various functions of the wireless terminal 100, including identifying descriptors from a database 40 as described herein. However, it should be understood that some of the functionality of the controller 132 can be provided by other devices in the network 114.

As shown in FIG. 7, the cellular transceiver 134 typically includes both a transmitter (TX) 150 and a receiver (RX) 152 to allow two way communications, but the present invention is not limited to such devices and, as used herein, a "transceiver" may include only the receiver 152. The mobile terminal 100 may thereby communicate with the base station 102 using radio frequency signals, which may be communicated through an antenna 154. For example, the mobile terminal 100 may be configured to communicate via the cellular transceiver 134 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. In some embodiments, the antennas 128 and 154 may be a single antenna.

It is noted that the operations according to some embodiments of the present invention as described with respect to FIGS. 5 and 6 may be at least partially carried out on the controller 132 and other components of the mobile terminal 100 according to embodiments of the present invention. Moreover, the GPS unit 139 can be used to identify the geographic location where an image is captured by the camera 160, and the clock 138 can be used to identify the time of day when the image is captured.

Although embodiments according to the invention are described with respect to a descriptor database 40 and a mobile terminal 100, it should be understood that other configurations can be used. For example, the descriptor database 40 can be provided in the memory 136 of the mobile terminal 100 and/or some or all of the operations described herein (e.g., in FIGS. 5 and 6) can be performed by a processor in the network 114, the descriptor database 40 and/or the mobile terminal 100. Moreover, in some embodiments, functions described with respect to the mobile terminal 100 can be provided, for example, on a personal computer, laptop, or other mobile or generally stationary electronic device, which may or may not be connected to a computer network. Although embodiments according to the invention have been described with respect to a plurality of users updating the database 40 with new images and descriptors, it should be understood that a personal descriptor database could be provided for a single user.

The present invention may be embodied as methods, electronic devices, and/or computer program products. Some embodiments of the present invention were described above with reference to block diagrams and/or operational illustrations of methods and electronic devices. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations can be embodied on analog circuitry and/or digital circuitry. These program instructions may be provided to a controller circuit, which may include one or more general purpose processors, special purpose processors, ASICs, and/or other programmable data processing apparatus, such that the instructions, which execute via the controller, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a controller circuit to function in a particular manner, such that the instructions stored in the computer usable or computer-readable memory produce an article of manufacture including instructions that implement the function specified in the flowchart and/or block diagram block or blocks. The computer-usable or computer-readable medium may be, for example but not limited to, an electronic, magnetic, optical, electromagnetic, or semiconductor system, apparatus, or device. More specific examples (a nonexhaustive list) of the computer-readable medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for automatically providing descriptors for images to a user, the method comprising:
   providing an image descriptor database having a plurality of image feature vectors, each of the plurality of image feature vectors having an associated descriptor;
   assigning a specificity value to each of the descriptors, wherein the specificity value comprises an estimation of a degree of description specificity;
   determining a first image feature vector for a first image;
   comparing the first image feature vector with the plurality of image vectors in the image descriptor database;
   identifying one or more descriptors for the first image vector based on the comparison of the first image feature vector with the plurality of image vectors and the specificity value of the corresponding descriptor;
   comparing image feature vectors in the database that have a selected associated descriptor in common to determine an estimated degree of similarity between the image feature vectors; and
   assigning the specificity value to the selected descriptor responsive to the estimated degree of similarity, wherein the image feature vector comprises image pixel data and/or characteristics determined by image recognition techniques.

2. The method of claim 1, wherein the image feature vector comprises a geographic location of the image, a time stamp, and/or a user identifier.

3. The method of claim 1, wherein providing an image descriptor database comprises:
   receiving image data including the plurality of image feature vectors and corresponding descriptors from a plurality of users;
   populating the image descriptor database with the plurality of image feature vectors from the image data and the corresponding descriptors.

4. The method of claim 1, further comprising displaying the descriptors corresponding to the identified image feature vectors to a user and receiving a selection of one or more of the descriptors from the user.

5. The method of claim 4, further comprising updating the image descriptor database such that the first image feature vector and the selected one of the descriptors is provided as one of the plurality of image feature vectors and corresponding descriptors and reassigning a specificity value based on the updated descriptor database.

6. A system for automatically providing descriptors for images to a user, the method comprising:
   an image descriptor database having a plurality of image feature vectors, each of the plurality of image feature vectors having one or more associated descriptor, wherein a specificity value comprising an estimation of a degree of description specificity is assigned to each of the descriptors;
   a controller configured to determine a first image feature vector for a first image, to compare the first image feature vector with the plurality of image vectors in the image descriptor database, and to identify one or more descriptors for the first image vector based on the comparison of the first image feature vector with the plurality of image vectors in the image descriptor database and the specificity value of the corresponding descriptor, wherein the controller is further configured to compare image feature vectors in the database that have a selected associated descriptor in common to determine an estimated degree of similarity between the image feature vectors and to assigning the specificity value to the selected descriptor responsive to the estimated degree of similarity and the image feature vector comprises image pixel data and/or characteristics determined by image recognition techniques.

7. The system of claim 6, wherein the image feature vector comprises a geographic location of the image, a time stamp, and/or a user identifier.

8. The system of claim 6, wherein the image descriptor database is configured to receive image data and corresponding descriptors from a plurality of users and the image descriptor database is populated with the plurality of image feature vectors from the image data and the corresponding descriptors.

9. The system of claim 6, wherein the controller is configured to display the descriptors corresponding to the identified image feature vectors to a user and to send a selection of one of the descriptors to the image descriptor database.

10. The system of claim 9, wherein the image descriptor database is updated such that the first image feature vector and the selected one of the descriptors is provided as one of the plurality of image feature vectors and corresponding descriptors.

11. A computer program product for automatically providing descriptors for images to a user based on an image descriptor database having a plurality of image feature vectors, each of the plurality of image feature vectors having an associated descriptor, wherein a specificity value is assigned to each of the descriptors such that the specificity value comprises an estimation of a degree of description specificity, the computer program product comprising:
  a non-transitory computer readable medium having computer readable program code embodied therein, the computer readable program code comprising:
  computer readable program code that is configured to determine a first image feature vector for a first image;
  computer readable program code that is configured to compare the first image feature vector with the plurality of image vectors in the image descriptor database;
  computer readable program code that is configured to identify one or more descriptors for the first image vector based on the comparison of the first image feature vector with the plurality of image vectors and the specificity value of the corresponding descriptor;
  computer readable program code that is configured to compare image feature vectors in the database that have a selected associated descriptor in common to determine an estimated degree of similarity between the image feature vectors; and
  computer readable program code that is configured to assign the specificity value to the selected descriptor responsive to the estimated degree of similarity, wherein the image feature vector comprises image pixel data and/or characteristics determined by image recognition techniques.

12. The computer program product of claim 11, wherein the image feature vector comprises a geographic location of the image, a time stamp, and/or a user identifier.

13. The computer program product of claim 11, wherein the image descriptor database is configured to receive image data and corresponding descriptors from a plurality of users and the image descriptor database is populated with the plurality of image feature vectors from the image data and the corresponding descriptors.

* * * * *